June 13, 1961
E. E. MUEHLNER
2,988,718
DETECTING PROBE
Filed March 18, 1959
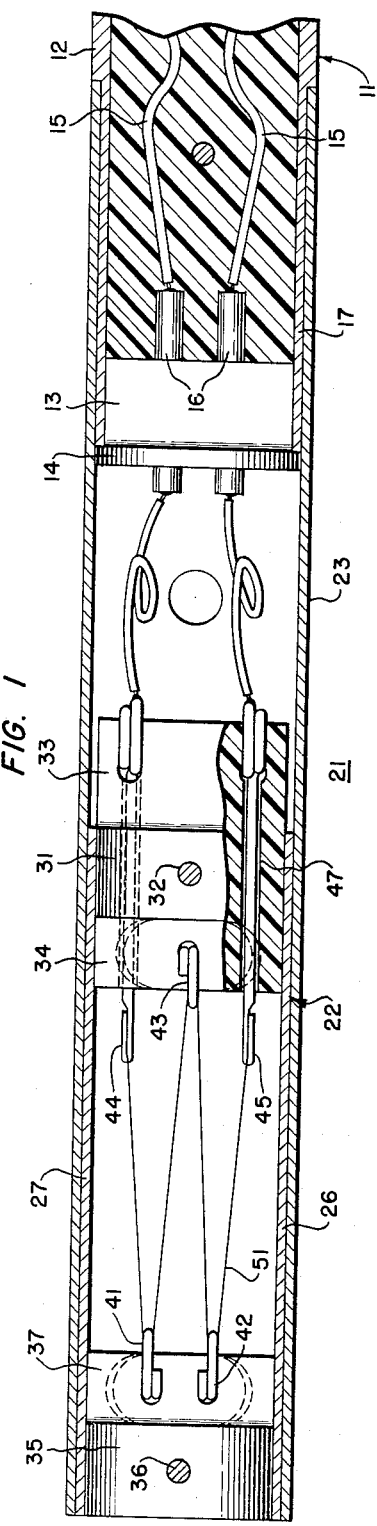
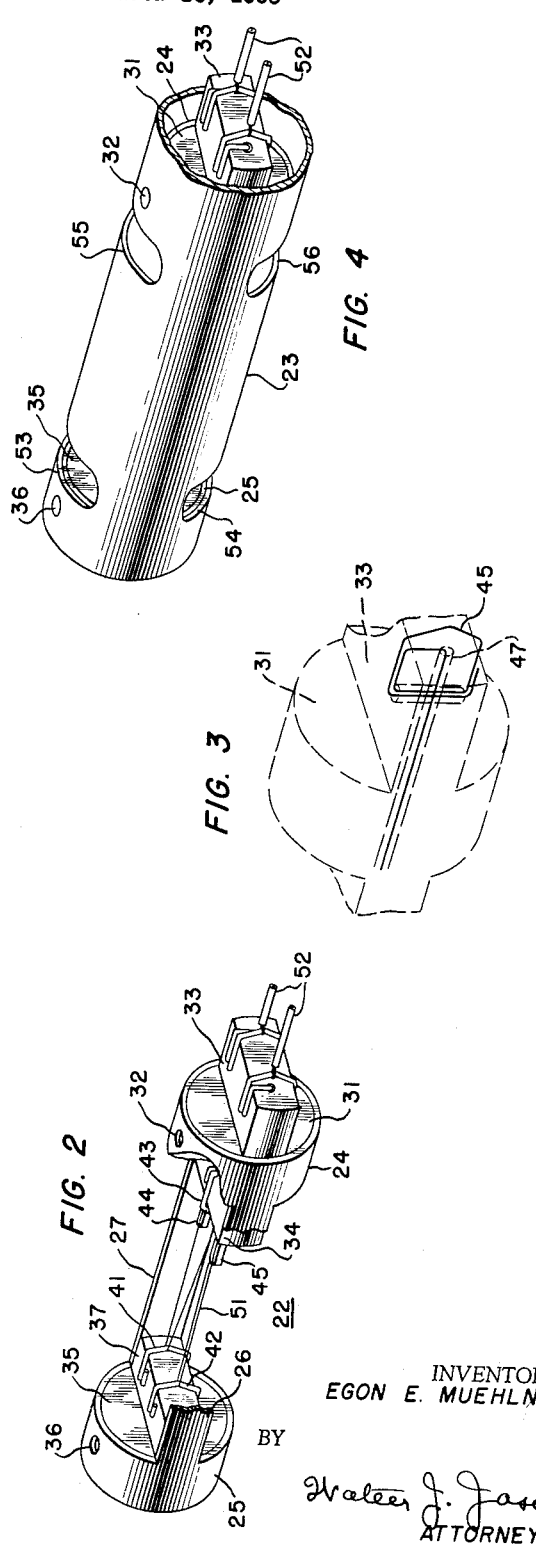
INVENTOR.
EGON E. MUEHLNER
BY
*Walter J. Jason*
ATTORNEY

United States Patent Office 2,988,718
Patented June 13, 1961

2,988,718
DETECTING PROBE
Egon E. Muehlner, San Diego, Calif., assignor to General Dynamics Corporation, San Diego, Calif., a corporation of Delaware
Filed Mar. 18, 1959, Ser. No. 800,240
6 Claims. (Cl. 338—28)

This invention relates to liquid detecting probes, and more particularly, to a cryogenic probe for detecting the presence of a liquified gas such as oxygen.

Such probes function due to the difference of thermal conductivity between the liquid phase and the gas phase. The gas in its liquid phase has a much greater thermal conductivity than in its gaseous phase. A heated electrical resistor having a temperature coefficient of resistance will be warmer immersed in the gas than when immersed in the liquid, thereby having one value of electrical resistance when in presence of the gas and another, different, value of electrical resistance when immersed in the liquified gas. In order to enable rapid indication when passing from one phase to the other, thermal conductivity must be as high as possible, and, concomitantly, thermal inertia must be as low as possible. Further, it is desirable that the entire sensing element be immersed in, or withdrawn from, the liquid simultaneously, requiring a very thin sensing element.

The liquified gas detecting probe of the present invention comprises a thin platinum filament, having a positive temperature coefficient of resistance, connected to a source of electric current. Current passing through the platinum filament serves to heat the filament. In a gas, equilibrium temperature and resistance, is higher than when immersed in the liquified gas. Therefore, with a constant voltage applied to the filament, current in the filament is greater when immersed in liquid than in gas.

The platinum filament in the probe of the present invention is fabricated in a plane, thereby enabling simultaneous immersion of the entire filament in the liquified gas. Thermal inertia is substantially only that of the platinum filament itself. Heat loss by radiation from the filament is minimized by provision of a radiation shield surrounding the filament. Apertures are provided in the radiation shield to enable free access of the fluid, whether liquid or gas, to the filament. The filament is mounted in a cartridge assembly easily removable from the probe for inexpensive manufacture and simple replacement in the field.

It is, therefore, an object of this invention to provide a cryogenic liquid detecting probe.

Another object of this invention is to provide a liquified gas detecting probe including a heated filament detecting element.

Another object of this invention is to provide a liquified gas detecting probe having a planar sensing element.

Another object of this invention is to provide a filament detecting element for a liquified gas detecting probe which is simple to manufacture.

Another object of this invention is to provide a liquified gas detecting probe having a radiation shield about a filament sensing element.

Another object of this invention is to provide a liquified gas detecting probe which is accurate, has extremely rapid response, is rugged, and is simple and inexpensive to manufacture.

These and other objects and advantages of this invention will become apparent from the following description considered in connection with accompanying drawing in which:

FIGURE 1 is a cross sectional view of a liquified gas detecting probe constructed in accordance with this invention;

FIGURE 2 illustrates the detecting element assembly employed in the probe of FIGURE 1;

FIGURE 3 schematically illustrates a retaining clip employed in the detecting element assembly of FIGURES 1 and 2; and FIGURE 4 is a perspective view of a portion of the radiation shield and detecting element holder employed in the probe of FIGURE 1.

Referring now to FIGURE 1 of the drawings, probe 11 comprises a tubular supporting body 12 fabricated of a suitable inert material such as stainless steel. A pressure fitting of a type well known to those skilled in the art and forming no part of the present invention, may be applied to body 12 to enable mounting probe 11 in the wall of a tank or conduit where it is desired to detect the presence of a liquified gas. A plug 13 having a shoulder 14 adapted to fit against the end of supporting body 12 closes the end of supporting body 12. A pair of conductors 15 have one end of each connected to a power source and indicator, not a part of the present invention, and the other end of each soldered to feedthrough conductors 16, passing through plug 13. Supporting body 12 has a reduced outside wall diameter portion 17, with the diameter of shoulder 14 on plug 13 being of like diameter as reduced diameter portion 17. Plug 13 is suitably bonded to tubular body 12, and body 12 is filled with a suitable, chemically inert synthetic resin, such as an epoxy resin, by means of the process known as "potting."

A transduced assembly 21 includes a detecting element assembly 22 and a radiation shield and holder 23. Detecting element assembly 22 includes a first ring 24 and a second ring 25 joined by side rails 26 and 27. Rings 24 and 25, and side rails 26 and 27 are conveniently fabricated as a unit from a stainless steel tube. A first cylinder 31, fabricated of a chemically inert thermal and electrical insulating material, exemplarily tetrafluoroethylene resin, is snugly fitted into the interior of ring 24. Cylinder 31 is secured in proper relation to ring 24, as by staked pin 32. Rear shoulder 33 and front shoulder 34, of suitable thermal and electrical insulating material, are provided on cylinder 31, preferably fabricated integrally with, and of the same material as cylinder 31. A second cylinder 35, preferably fabricated of the same material as first cylinder 31, is snugly fitted into the interior of ring 25 and fastened in proper relation thereto as by staked pin 36. A should 37, preferably fabricated integrally with cylinder 35, is furnished facing shoulder 34 on cylinder 31.

Filament retaining clips 41 and 42 are fastened to shoulder 37. Clips 41 and 42 are conveniently formed of small loops of flattened fine platinum wire passed through suitable apertures piercing shoulder 37 parallel to the face of cylinder 35. A third filament retaining clip 43, substantially identical to clips 41 and 42, is fastened to front shoulder 34 of cylinder 31 in the same manner as clips 41 and 42 are fastened to shoulder 37. Filament terminals 45 are fabricated from fine platinum wire, as are retaining clips 41, 42 and 43. As illustrated schematically in FIGURE 3, terminal 45 is formed into a double loop through aperture 46 in shoulder 33, with the smaller loop passing through aperture 47, perpendicular to aperture 46. The other end of terminal 45 passes through shoulder 33, cylinder 31 and shoulder 34. The end extending beyond should 34 is flattened and formed into a hook. Filament terminal 44 is identical to filament terminal 45.

Sensing element 51 comprises a fine wire having a high temperature coefficient of resistance, low thermal inertia, and is chemically inert. A platinum filament having a diameter of a thousandth of an inch is employed in a preferred embodiment of this invention. One end of sensing element 51 is soldered, brazed, or otherwise fastened to terminal 44. Sensing element 51 passes in turn through clip 41, clip 43, clip 42, and fastened, as by soldering, brazing, etc. to terminal 45, in an M configuration. Terminals 44 and 45 are connected to feed-through conductors 16 by insulated conductors 52, and, through conductors 15, to a power source and indicator, not a part of the present invention.

The relationship between radiation shield and detecting element holder 23 and detecting element assembly 22 is illustrated in FIGURES 1 and 4. Radiation shield 23 telescopes onto supporting body 12 and is pinned or otherwise fastened thereto. Detecting element assembly 22 is mounted within radiation shield 23 so that cylinder 35 and ring 25 are flush with the forward end of radiation shield 23. A first pair of oblong apertures 53 and 54 are provided in radiation shield 23 adjacent the top and bottom of shoulder 37 and alongside retaining pin 36. Similarly, a second pair of oblong apertures 55 and 56 are provided adjacent the top and bottom of shoulder 34, alongside retaining pin 32. Apertures 53, 54, 55 and 56 enable ready access to sensing filament 51 by the liquid or gas, while the shield 23 protects the delicate filament 51 from damage, and provides a radiation shield. Sensitivity and speed of response is increased by radiation shield 23. Loss of heat from the filament 51 when in a gas by radiation to the cold liquid container walls and to the liquid surface is prevented, thereby increasing the filament temperature when in the gas. Radiation shielding is provided by reflection by the inner wall back to the filament of infra red heat radiated by the filament. The apertures 53, 54, 55 and 56 are placed so that substantially no heat is radiated therethrough. Heat is lost by the filament only through conduction and convection. When immersed in the liquified gas, the liquid contacts the filament and lowers the temperature thereof by conducting heat therefrom. The resistance of the filament decreases rapidly, as the temperature decreases, enabling indication by a suitable electrical device, not part of the present invention.

Hereinabove has been disclosed a cryogenic liquid sensing device having low thermal inertia, a high temperature and resistance differential between gas and liquid immersion, chemical inertness, and a planar sensing element for contacting the planar liquid surface. As a result, speed of response is rapid, indicating the liquid surface accurately, and a relatively simple indicating device may be employed. It is compact, simple and inexpensive to manufacture. While a presently preferred embodiment has been specifically disclosed, it is understood that the invention is not limited thereto as many variations will be readily apparent to those skilled in the art, and the invention is to be given its broadest possible interpretation within the terms of the following claims.

What I claim is:

1. A liquified gas detecting probe comprising a detecting element assembly including first and second insulating cylinders, a first supporting shoulder on said first cylinder, a second shoulder on said second cylinder facing said first shoulder, means for maintaining said cylinders in spaced, parallel reationship, a detecting filament held by said supporting shoulders between said cylinders, first and second electrical terminals connected to said detecting filament and mounted on said second supporting shoulder, and a radiation shield containing said first and second cylinders and said detecting filament.

2. A liquified gas detecting probe comprising a detecting element assembly having spaced first and second supporting rings, rails connecting said first and second supporting rings parallel to one another, a first insulating cylinder secured inside said first ring and having a first shoulder, a second insulating cylinder secured inside said second ring and having a second shoulder facing said first shoulder, filament supporting means mounted on said first and second shoulders, electrical terminals secured to said second shoulder, a detecting filament connected to said electrical terminals and supported between said shoulders by said supporting means, a hollow cylindrical shield surrounding said detecting filament and said rings, means for fastening said shield to said rings, a tubular supporting body, and means for fastening said shield to said supporting body.

3. A liquified gas detecting probe comprising a detecting element assembly having spaced first and second supporting rings, rails connecting said first and second supporting rings in parallel relationship, a first insulating cylinder inside said first ring, a second insulating cylinder inside said second ring, means for securing said first cylinder to said first ring and said second cylinder to said second ring, a first shoulder integral with said first cylinder, a second shoulder facing said first shoulder integral with said second cylinder, filament supporting means mounted on said first and second shoulders, electrical terminals secured to said second shoulder, a detecting filament connected to said electrical terminals and supported between said shoulders by said supporting means, a hollow cylindrical shield surrounding said detecting filament and said rings, means for fastening said shield to said rings, a tubular supporting body, and means for fastening said shield to said supporting body.

4. A liquified gas detecting probe comprising a detecting element assembly having spaced first and second supporting rings, first and second parallel rails connecting said first and second supporting rings in parallel relationship, a first insulating cylinder secured inside said first ring and having a first shoulder, a second insulating cylinder secured inside said second ring and having a second shoulder facing said first shoulder, filament supporting clips secured to said first and second shoulders, first and second electrical terminals secured to said second shoulder, a platinum detecting filament having one end connected to said first terminal and the other end connected to said second terminal and supported between said shoulders by said clips, a hollow cylindrical shield surrounding said detecting filament and said rings, means for fastening said shield to said rings, a tubular supporting body, and means for fastening said shield to said supporting body.

5. A liquified gas detecting probe comprising a detecting element assembly having spaced first and second supporting rings, first and second parallel rails connecting said first and second supporting rings in parallel relationship, a first insulating cylinder inside said first ring, a second insulating cylinder inside said second ring, means for securing said first cylinder to said first ring and said second cylinder to said second ring, a first shoulder integral with said first cylinder, a second shoulder facing said first shoulder integral with said second cylinder, filament supporting clips secured to said first and second shoulders, first and second electrical terminals secured to said second shoulder, a platinum detecting filament having one end connected to said first terminal and the other end connected to said second terminal and supported between said shoulders by said clips, a hollow cylindrical shield surrounding said detecting filament and said rings, means for fastening said shield to said rings, a tubular supporting body, and means for fastening said shield to said supporting body.

6. A liquified gas detecting probe comprising a detecting element assembly having spaced first and second supporting rings, first and second parallel rails connecting said first and second supporting rings in parallel relationship, a first insulating cylinder inside said first ring, a second insulating cylinder inside said second ring, means for securing said first cylinder to said first ring and said second cylinder to said second ring, a first shoulder integral with said first cylinder, a second shoulder integral with said second cylinder facing said first shoulder, first and second clips secured to said first shoulder, a third clip secured to said second shoulder, first and second electrical terminals secured to said second shoulder, a platinum detecting filament having one end connected to said first terminal and the other end connected to said second terminal and supported between said shoulders by said clips, a hollow cylindrical shield surrounding said detecting filament and said rings, means for fastening said shield to said rings, a tubular supporting body, and means for fastening said shield to said supporting body.

References Cited in the file of this patent

UNITED STATES PATENTS

| | | |
|---|---|---|
| 2,428,003 | Beam et al. | Sept. 30, 1947 |
| 2,579,271 | Poyle | Dec. 18, 1951 |
| 2,769,074 | Dyckerhoff | Oct. 30, 1956 |
| 2,870,306 | Ohlheiser | Jan. 20, 1959 |